(12) United States Patent
Ben-Shachar et al.

(10) Patent No.: US 7,439,937 B2
(45) Date of Patent: Oct. 21, 2008

(54) APPROPRIATELY RENDERING TERMINAL SERVER GRAPHICAL DATA AT MULTIPLE CLIENT SIDE MONITORS

(75) Inventors: Ido M. Ben-Shachar, Kirkland, WA (US); John E. Parsons, Redmond, WA (US); Pui Loi Joy Chik, Sammamish, WA (US); Nadim Abdo, Bellevue, WA (US); Nelly Porter, Kirkland, WA (US); Robert-Wilhelm Schmieder, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 420 days.

(21) Appl. No.: 11/404,517

(22) Filed: Apr. 14, 2006

(65) Prior Publication Data
US 2007/0244967 A1 Oct. 18, 2007

(51) Int. Cl.
*G09G 5/00* (2006.01)
*G09G 5/14* (2006.01)
*G06F 15/16* (2006.01)
*G06F 9/00* (2006.01)
*G06F 13/00* (2006.01)
*G06F 9/455* (2006.01)
*G06F 3/14* (2006.01)

(52) U.S. Cl. ............... 345/1.1; 345/581; 345/522; 715/273; 715/735; 709/201; 709/219; 709/220; 709/204; 718/1

(58) Field of Classification Search ......... 709/201–205, 709/217–222, 250; 345/1.1–1.35, 2.1, 501, 345/581, 522; 715/273, 748, 733–738; 718/1; 726/2

See application file for complete search history.

(56) References Cited

U.S. PATENT DOCUMENTS

| 5,682,486 | A | 10/1997 | Grossman et al. |
| 5,923,307 | A | 7/1999 | Hogle, IV |
| 6,292,211 | B1 | 9/2001 | Pena |
| 6,299,464 | B1 | 10/2001 | Chen |

(Continued)

FOREIGN PATENT DOCUMENTS

EP 0579402 A1 1/1994

OTHER PUBLICATIONS

Platform Builder for Microsoft Windows CE 5.0 "Multiple Screens OS Design Development", 1 page 2005 Microsoft Corporation http://msdn.microsoft.com/library/default.asp?url=/library/en-us/wcemultimedia5/html/wce50conmultiplescreensoverview.asp.

(Continued)

*Primary Examiner*—Wesner Sajous
(74) *Attorney, Agent, or Firm*—Workman Nydegger

(57) ABSTRACT

The present invention is directed to appropriately rendering terminal server graphical data at multiple client side monitors. In some embodiments, a client sends client side monitor configuration for a plurality of monitors to a server. The server simulates a virtual desktop for the plurality of monitors based on the client side monitor configuration. Graphical data generated for the simulated virtual desktop is converted to drawing commands and returned to the client for rendering. In other embodiments, a separate terminal server session is established for each of a plurality client side monitors. Drawing commands for a specified client side monitor is sent from the terminal server to the client over the corresponding session for the client side monitor.

20 Claims, 7 Drawing Sheets

U.S. PATENT DOCUMENTS

| | | | |
|---|---|---|---|
| 6,654,034 | B1 | 11/2003 | Kanevsky et al. |
| 6,823,525 | B1 | 11/2004 | Martyn |
| 6,844,865 | B2 | 1/2005 | Stasko |
| 6,921,365 | B2 | 7/2005 | Lee |
| 2003/0001795 | A1 | 1/2003 | Stasko |
| 2003/0191850 | A1 | 10/2003 | Thornton |
| 2003/0212811 | A1 | 11/2003 | Thornton |
| 2005/0102356 | A1 | 5/2005 | Manion et al. |
| 2005/0125488 | A1* | 6/2005 | Kulkarni et al. ............. 709/201 |
| 2007/0038939 | A1* | 2/2007 | Challen et al. ............. 715/734 |
| 2007/0079252 | A1* | 4/2007 | Ramnani ................... 715/781 |
| 2007/0174291 | A1* | 7/2007 | Cooper et al. ................ 707/10 |
| 2007/0198616 | A1* | 8/2007 | Goto .......................... 707/205 |

OTHER PUBLICATIONS

UltraMon "Get the most out of multiple monitors with UltraMon", 1 page Copyright 2000-2005 by Realtime Soft. http://www.realtimesoft.com/ultramon/.

Tony Northrup, Windows XP Expert Zone Community Columnist "Configure Multiple Monitors and Dualview", 6 pages Jul. 26, 2004 http://www.microsoft.com/windowsxp/using/setup/learnmore/northrup_multimon.mspx.

MaxiVista "Your Laptop as a dual monitor", 1 page Copyright 2003-2005 Bartels media http://www.maxivista.com/.

9X Media "Multi-Screen Display Systems—X-top™ Desktop Displays, X-Wall™ Video Walls, 9x NOC Furniture, Portable Multi-Screen Media Center", 4 pages http://www.9xmedia.com/Pages-products/Products.html.

\* cited by examiner

APPROPRIATELY RENDERING TERMINAL SERVER GRAPHICAL DATA AT MULTIPLE CLIENT SIDE MONITORS

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the communication (e.g., the exchange of electronic messages) between a number of computer systems and/or other electronic devices via wired and/or wireless computer networks.

A computer system typically includes at least a processor and system memory used to execute programs. In many environments, computer systems also have multiple peripheral devices used to perform different computer related tasks. For example, a computer system can include a keyboard, a mouse, a disk drive, a video card, a display device, a printer, a network card, etc. In some environments, a computer system can include a number of similar types of peripherals. For example, a computer system may include multiple disk drivers, multiple display devices, etc.

Appropriate software at the computer system can facilitate interoperation of multiple similar peripherals with one another as well as with other components of a computer system. For example, appropriate device drivers can allow components to access data stored at any of multiple disk drives of a computer system. Some software is also able to combine multiple different physical devices into a single logical device from the perspective of a computer system. For example, Redundant Array of Independent (or Inexpensive) Disks ("RAID") drivers can combine two or more disk drives into a single logical drive from the perspective of a computer system.

Various hardware and software can also facilitate the use of multiple monitors at the same computer system. For example, a computer system can include multiple video cards or can include video cards have multiple output ports. A monitor can be connected to each video card or to each port of a video card.

Many operating systems have integrated multi-monitor support. The operating systems provide the necessary software to allow simultaneously use of multiple monitors when display locally generated video data. The software allows each monitor to present part of an underlying user-interface with input devices capable of entering input into applications displayed on any monitor. Objects can be moved between monitors or expanded across multiple monitors.

The integrated software can also operate intelligently to efficiently utilize the viewable area of all monitors. For example, when an application is maximized, the application can be maximized only to the dimensions of the current monitor. Thus, the area of other monitors is left free for other computing tasks. The integrated software can also support flexible positioning of monitors. For example, a combination of monitors with some monitors turned vertically and some monitors turned horizontally can be supported.

In some computing environments, entities also use terminal servers to provide remote access to applications and data. A terminal server is a computer system that maintains applications that can be remotely executed by client computer systems. Input is entered at a client computer system and transferred over a network (e.g., using protocols based on the ITU T.120 family of protocols, such as, for example, Remote Desktop Protocol ("RDP")) to an application at the terminal server. The application processes the input as if the input was entered at the terminal server. The application generates output in response to the received input and the output is transferred over the network (e.g., also T.120 based protocols) to the client computer system. The client computer system presents the output data.

Thus, input is received and output presented at the client computer system, while processing actually occurs at the terminal server. In most, if not all terminal server environments, input data (entered at a client computer system) typically includes mouse and keyboard data representing commands to an application and output data (generated by an application at the terminal server) typically includes video data for display at a display device.

Unfortunately, terminal server software typically lacks support for multiple monitors. That is, a client participating in a terminal server session is typically limited to using a single monitor to display and interact with video data generated at a terminal server.

Some terminal server implementations include software for operating a terminal server client in "span-mode". Span-mode allows a terminal server client to display terminal server video data across two monitors. That is, the terminal server video data spans across the two monitors. For example, a client computer system may have two monitors running at a resolution 1024×768. In span-mode, a terminal server client can create a single extra-wide terminal server client window that spans both monitors, for example, with a dimension of 2048×768.

However, span-mode does not provide true multi-monitor support. For example, span-mode does not permit the same level of intelligence in maximizing applications. For example, in span-mode with two monitors, maximizing an application causes the application to be maximized to full size of both monitors. Maximizing across both monitors unnecessarily consumes display area that could otherwise be used for other computing tasks. Further, span node does not allow the flexible positions of monitors. For example, when two monitors running at 1024×768 resolution on are placed vertically (instead of horizontally), span-mode lacks the functionality to create a 1024×1536 version of a terminal server client window.

BRIEF SUMMARY

The present invention extends to methods, systems, and computer program products for appropriately rendering terminal server graphical data at multiple client side monitors. In some embodiments, a client sends a client side monitor configuration to a server. The client side monitor configuration indicates a physical arrangement of a plurality of monitors relative to one another at the client.

A server receives the client side monitor configuration. The server simulates a virtual desktop for the plurality of monitors based on the client side monitor configuration. The server configures an operating system to write graphical to the simulated virtual desktop. Graphical data written from the operating system to the simulated virtual desktop is collected. The graphical data is directed to at least two monitors in the simulated virtual desktop. The server converts the graphical data into drawing commands configured for rendering on at least two monitors of the plurality of monitors. The server sends the drawing commands to the client.

The client receives the drawing commands from the server. The client identifies drawing commands that correspond to each of at least two of the plurality of monitors. The identified drawing commands are rendered at corresponding monitors.

In other embodiments, a client sends first and second session establishment data corresponding to first and second client side monitors respectively. The server receives the first and second session establishment data and establishes a first session and a second session between the client and the server respectively. The server configures an operating system to write graphical data for the first monitor to the first session and to write graphical data for the second monitor to the second session.

Graphical data written from the operating system to at least one client side monitor is collected. The graphical data includes drawing commands directed to at least one client side monitor. The graphical data is concerted into drawing commands configured for rendering on the at least one client side monitor. The drawing commands are sent to the client over appropriate sessions. The client receives the drawing commands for the at least one client side monitor over the appropriate sessions. The drawing commands are rendered at appropriate client side monitors based on the session associated with the drawing commands.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
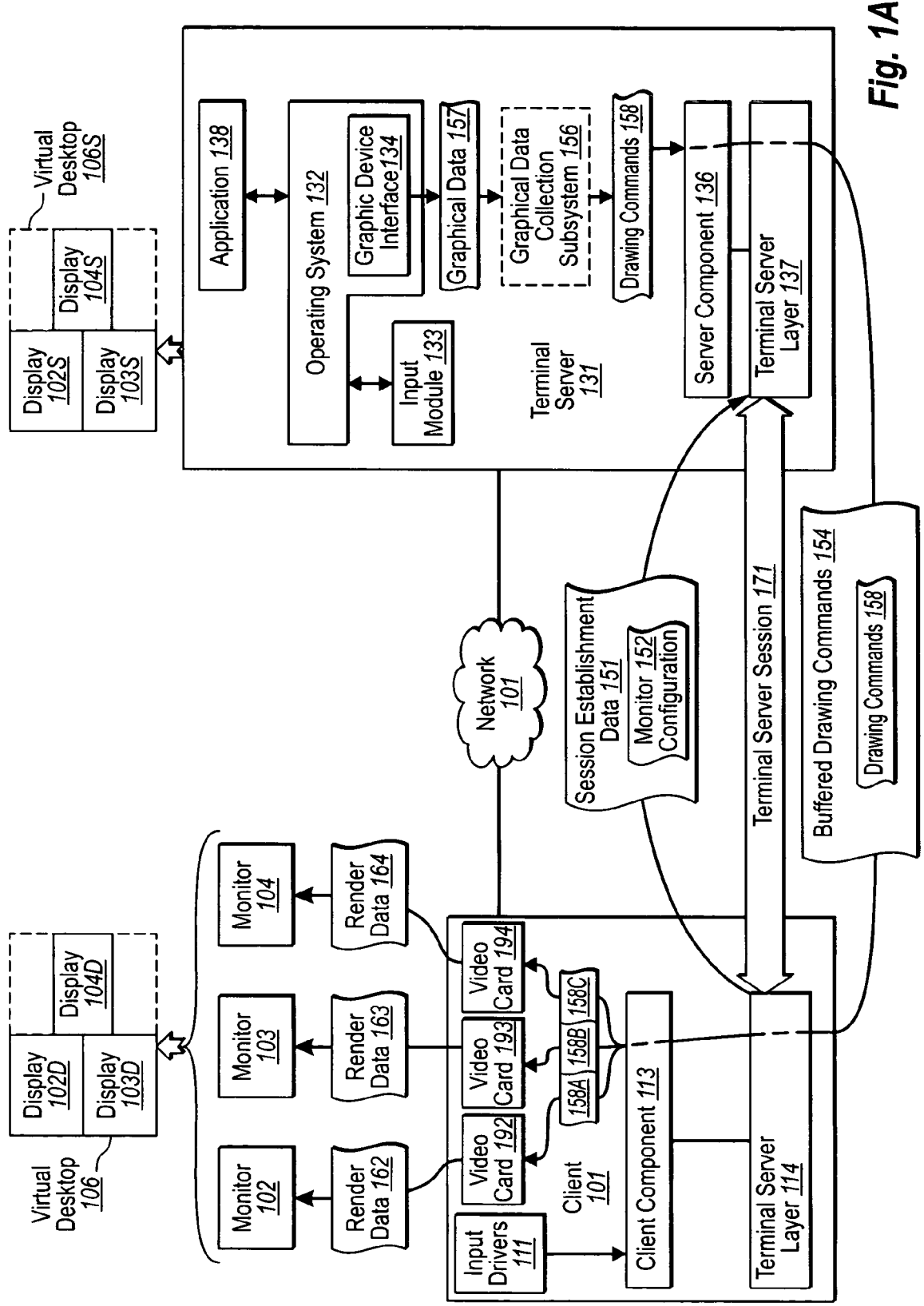
FIG. 1A illustrates an example computer architecture that facilitates appropriately rendering terminal server graphical data at multiple client side monitors.

The present invention extends to methods, systems, and computer program products for appropriately rendering terminal sever graphical data at multiple client side monitors. In some embodiments, a client sends a client side monitor configuration to a server. The client side monitor configuration indicates a physical arrangement of a plurality of monitors relative to one another at the client.

A server receives the client side monitor configuration. The server simulates a virtual desktop for the plurality of monitors based on the client side monitor configuration. The server configures an operating system to write graphical to the simulated virtual desktop. Graphical data written from the operating system to the simulated virtual desktop is collected. The graphical data is directed to at least two monitors in the simulated virtual desktop. The server converts the graphical data into drawing commands configured for rendering on at least two monitors of the plurality of monitors. The server sends the drawing commands to the client.

The client receives the drawing commands from the server. The client identifies drawing commands that correspond to each of at least two of the plurality of monitors. The identified drawing commands are rendered at corresponding monitors.

In other embodiments, a client sends first and second session establishment data corresponding to first and second client side monitors respectively. The server receives the first and second session establishment data and establishes a first session and a second session between the client and the server respectively. The server configures an operating system to write graphical data for the first monitor to the first session and to write graphical data for the second monitor to the second session.

Graphical data written from the operating system to at least one client-side monitor is collected. The graphical data includes drawing commands directed to at least one client side monitor. The graphical data is concerted into drawing commands configured for rendering on the at least one client side monitor. The drawing commands are sent to the client over appropriate sessions. The client receives the drawing commands for the at least one client side monitor over the appropriate sessions. The drawing commands are rendered at appropriate client side monitors based on the session associated with the drawing commands.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. In this description and in the following claims, a terminal server protocol is defined as any protocol based on or that extends the ITU T.120 family of protocols, such as, for example, Remote Desktop Protocol ("RDP")).

FIG. 1A illustrates an example computer architecture 100 that facilitates appropriately rendering terminal server graphical data at multiple client side monitors. Computer architecture 100 includes client 101 and terminal server 131. Each of client 101 and terminal server 131 can be connected to network 191, such as, for example, a Local Area Network ("LAN"), a Wide Area Network ("WAN"), or even the Internet. Thus, the various components at client 101 and terminal serer 131 can receive data from and send data to each other, as well as other components connected to network 191. Accordingly, the components can create message related data and exchange message related data (e.g., Internet Protocol ("IP") datagrams and other higher layer protocols that utilize IP datagrams, such as, Transmission Control Protocol ("TCP"), RDP, Hypertext Transfer Protocol ("HTTP"), Simple Mail Transfer Protocol ("SMTP"), etc.) over network 191.

Generally, client 101 can be a computer system in communication with terminal server 131 for remote execution of applications at terminal server 131. Thus, input data (e.g., mouse and keyboard input) representing application commands is received at input drivers 111. The input data is transferred over network 191 to terminal server 131. Input module 133 receives the input data.

Input module 133 supplies the input data to the appropriate application at terminal server 131. The application generates output display data in response to the input data. The output display data is transferred over network 191 to client 101. Client component 113 receives the output display data and determines how to distribute the output display data to video display devices associated with client 101. Thus, input is received and output presented at the client 101, while processing actually occurs at the terminal server 131.

At client 101, client side data (input data received at input drivers 111, etc.) for transfer to terminal serer 131 passes down through client component 113, terminal server layer 114 (e.g., an RDP layer), other lower layers (e.g., a TCP/IP layer), and onto network 191. Terminal server 131 receives input data and performs essentially the inverse of the operations that were performed at client 101. That is, client side data (input data, etc) passes up from network 191, through other lower layers, terminal server layer 137, and server component 136.

Terminal server 131 can then forward client side data to input module 133. Input module 133 can present the client side data to operating system 132. Operating system 132 then distributes the input data to the appropriate application (e.g., application 138).

In response to client side data, an application can generate output display commands. The application can send output display commands to operating system 132. Output display commands can include one or more paint and/or draw operations, for example, in the form of executable instructions. Operating system 132 and graphic device interface ("GDI") 134 can interoperate to output corresponding graphic update commands (e.g., GDI rendering commands) to appropriate display drivers. Remote display drivers in graphical data collection subsystem 156 can collect the graphic update commands and generate corresponding drawing commands configured for a specified display device. Remote display drivers in graphical data collection subsystem 156 can convert graphic update commands into drawing commands (e.g., graphic update PDUs) for rendering at specified client side display devices.

The drawing commands can be included in a network buffer, passed down through server component 136, terminal serer layer 137, other lower level lawyers, and onto network 191. Client 101 receives the buffered drawing commands and performs essentially the inverse of the operations that were performed at terminal server 131. That is display data passes up from network 191, through other lower layers, terminal server layer 114, and client component 113. Client component 113 identifies drawing commands that correspond to specific client side monitors and forwards the drawing commands to appropriate video drivers for rendering at the specified client side monitors. Video cards 192, 193, and 194 are configured to rendering drawing commands corresponding to monitors 102, 103, and 104 respectively.

Logically (i.e., abstracted from lower layer protocols), terminal server layer 114 and terminal server layer 137 can be configured to establish terminal server sessions, in accordance with terminal server protocols, between client 101 and terminal server 131.

Figure 2:
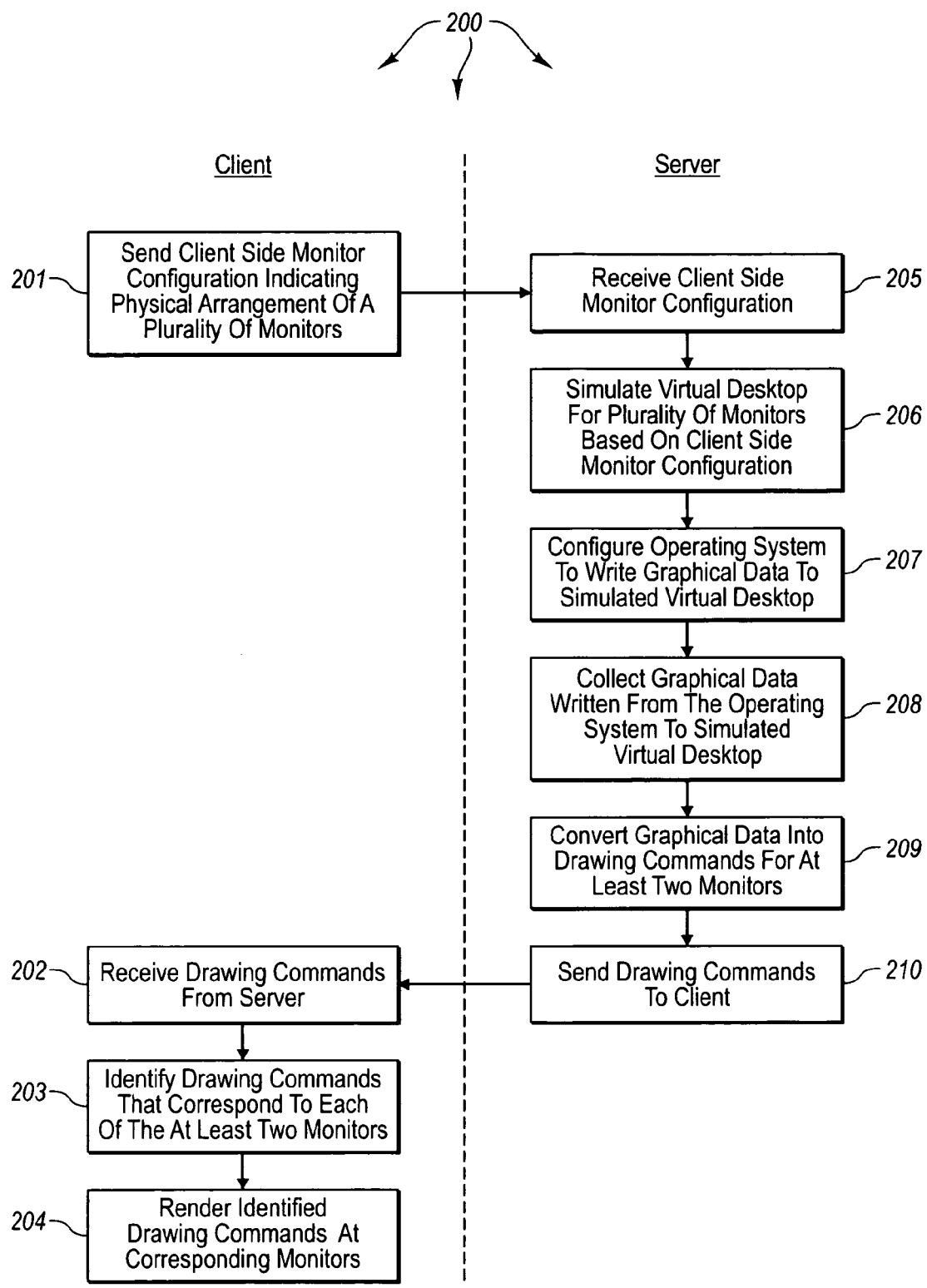
FIG. 2 illustrates a flow chart of an example method for appropriately rendering terminal server graphical data at multiple client side monitors.

FIG. 2 illustrates a flow chart of an example method 200 for appropriately rendering terminal server graphical data at multiple client side monitors. The method 200 will be described with respect to the components and data in computer architecture 1100.

Method 200 includes an act of sending a client side monitor configuration, indicating a physical arrangement of a plurality of monitors, to a server (act 201). For example, client 101 can send client side monitor configuration data to terminal server 131. The client side monitor configuration data can indicate the characteristics of monitors 102, 103, and 104 (e.g., display area, orientation, resolution, etc) as well as their position relative to one another (e.g., monitor 102 is above monitor 103, monitor 104 is to the right of monitor 102, etc.). From client side configuration data, client 101 can create virtual desktop 106. Virtual desktop 106 represents an arrangement of display areas 102D, 103D and 104D (of monitors 102, 103 and 104 respectively) relative to one another. Virtual desktop 106 also includes a rectangle that bounds the combined display areas 102D, 103D, and 104D.

In some embodiments, terminal server layer 114 includes a monitor configuration for the monitors of client 101 in session establishment data used to establish a terminal server session. For example, terminal server layer 114 can send session establishment data 151, including monitor configuration 152, to terminal server 137.

Method 200 includes an act of receiving a client side monitor configuration (act 205). For example, terminal server 131 can receive client side monitor configuration data indicating the physical arrangement of a plurality of monitors relative to one another at a client. In some embodiments, terminal server layer 137 receives a monitor configuration for the monitors of a client in session establishment data. For example, terminal server layer 137 can receive session establishment data 151, including monitor configuration 152 (indicating the configuration of monitors 102, 103 and 104), from client 101.

In response to session establishment data 151, terminal server layer 137 and terminal server layer 114 can negotiate to establish terminal server session 171 (e.g., an RDP session) between client 1010 and terminal server 131

Method 200 includes an act of simulating a virtual desktop for the plurality of monitors based on the client side monitor configuration (act 206). For example, from monitor configuration 152, terminal server 131 can create virtual desktop 106S. Virtual desktop 106S simulates virtual desktop 106. That is, the virtual desktop 106S arranges and bounds the combined display areas 102S, 103S, and 104S similarly (or the same) as virtual desktop 106.

In some embodiments, monitor configuration 152 is passed up to operating system 132. Operating system 132 then creates virtual desktop 106S. For example, graphic device interface 134 can communicate with available display drivers in graphical collection subsystem 156 to determine the configuration of virtual desktop 106S. For example, graphic device interface 134 can obtain graphical output settings, such as, for example, resolution, color depth settings, etc., from display drivers in graphical collection subsystem 156. Graphic device interface 134 can configure a virtual desktop 106S based on obtained graphical output settings.

Operating system 132 can also retain monitor configuration 152 and other graphical output settings related to virtual desktop 106S. Operating system 132 can use monitor configuration 152 and obtained graphical output settings to configure an application to write graphics data to virtual desktop 106S.

Method 200 includes an act of configuring an operating system to write graphical data to the simulated virtual desktop (act 207). For example, graphic device interface 134 can be configured to write graphical data to virtual desktop 106S based on monitor configuration 152 and obtained graphical output settings.

Method 200 includes an act of collecting graphical data written from the operating system to the virtual desktop (act 208). For example, graphical data collection subsystem 156 can collect graphical data 157 (e.g., GDI rendering commands). Graphical data 157 is configured for rendering at virtual desktop 106S.

Figure 1B:
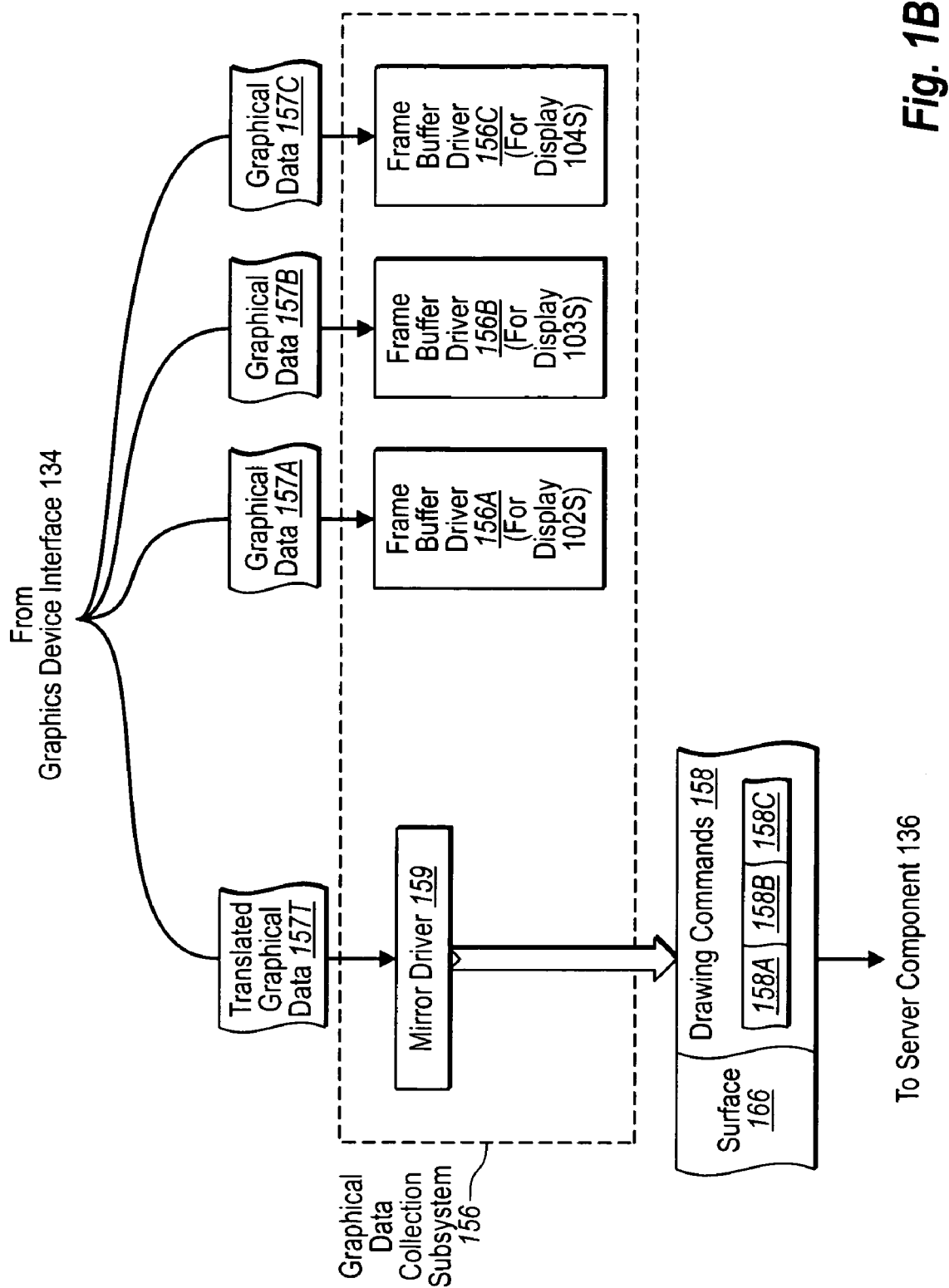
FIGS. 1B, 1C, and 1D illustrate various example graphical data collection subsystems that can be included in the computer architecture of FIG. 1A to collect graphical data.

FIG. 1B illustrates one example embodiment of graphical data collection subsystem 156. As depicted in FIG. 1A, graphical data collection subsystem 156 includes mirror driver 159 and frame buffer drivers 156A, 156B, and 156C. Frame buffer drivers 156A, 156B, and 156C correspond to monitors 102, 103, and 104 respectively. Thus, graphic device interface 135 can communicate with mirror driver 159 and frame buffer drivers 156A, 156B, and 156C to obtain graphical output settings. Frame buffer drivers 156A, 156B, and 156C can indicate graphical output settings for virtual desktop 106S to graphic device interface 135. Mirror driver 159 can indicate to graphic device interface 135 that mirror driver 159 is to receive any graphical data written to virtual desktop 106S. Thus, frame buffer drivers 156A, 156B, and 156C can form a virtual desktop area (virtual desktop 106S) that is mirrored by mirror driver 159.

Accordingly, any graphical data sent to buffer driver 156A, 156B, or 156C corresponding mirrored graphical data is also sent to mirror driver 159. For example, frame buffer drivers 156A, 156B, and 156C can receive graphical data 157A, 157B, and 157C (portions of graphical data 157) respectively. Mirror driver 159 can receive translated graphical data 157T (a portion of graphical data 157) mirroring graphical data 157A, 157B, and 157C.

Figure 1D:
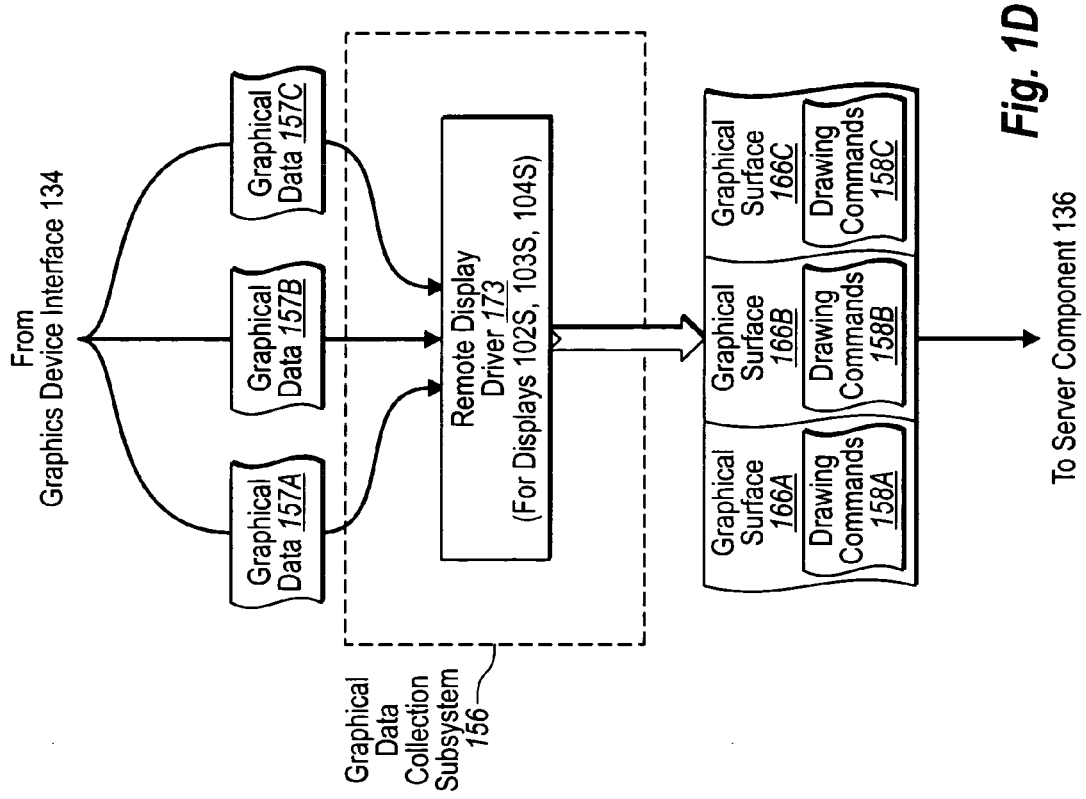
Figure 1C:
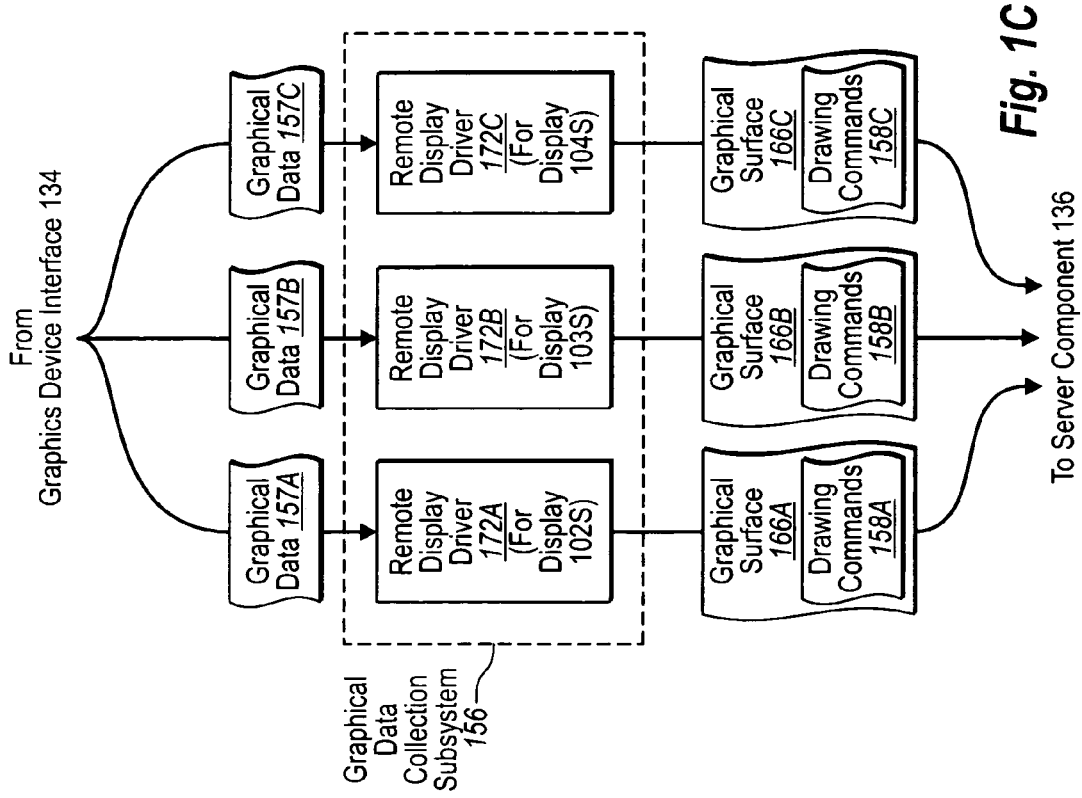

FIG. 1C illustrates another example embodiment of graphical data collection subsystem 156. As depicted in FIG. 1C, graphical data collection subsystem includes a remote display driver corresponding to each monitor at client 101. Remote display drivers 172A, 172B, and 172C correspond to monitors 102S, 103S, and 104S respectively. Remote display drivers 172A, 172B, and 172C simulate monitors that operating system 132 can use to configure virtual desktop 106S. Graphic device interface 134 can communicate with each remote display driver to obtain graphical settings for a corresponding monitor. Graphic device interface 134 can configure graphical data per monitor and send appropriate graphical data to each of display drivers 172A, 172B, and 172C. For example, graphics device interface can send graphical data 157A, 157B, and 157C (portions of graphical data 157) to remote display drivers 172A, 172B, and 172C respectively.

FIG. 1D illustrates another example embodiment of graphical data collection subsystem 156. As depicted in FIG. 1D, graphical data collection subsystem includes remote display driver 173. Remote display driver 173 is configured to receive graphical data for any monitors at client 101. Remote display driver 173 simulates monitors that operating system 132 can use to configure virtual desktop 106S. Graphic device interface 134 can communicate with remote display driver 173 to obtain graphical settings for displays 102S, 103S, and 104S. Graphic device interface 134 can configure graphical data per monitor and send the graphical data to remote display driver 173. For example, graphics device interface can send graphical data 157A, 157B, and 157C (portions of graphical data 157) to remote display driver 173.

Method 200 includes an act of graphical data into drawing commands configured for rendering on at least two of the plurality of monitors (act 209). For example, graphics collection subsystem 156 can convert graphical data 157 into drawing commands 158 (e.g., graphic update PDUs).

Referring back to FIG. 1B, mirror driver 159 can convert graphical data 157T into drawing commands 158T (a portion of drawing commands 158), mirroring drawing commands that can be generated from graphical data 157A, 157B, and 157C. Drawing commands 158T can be output to surface 166, a primary destination drawing surface of client 101.

Figure 5:
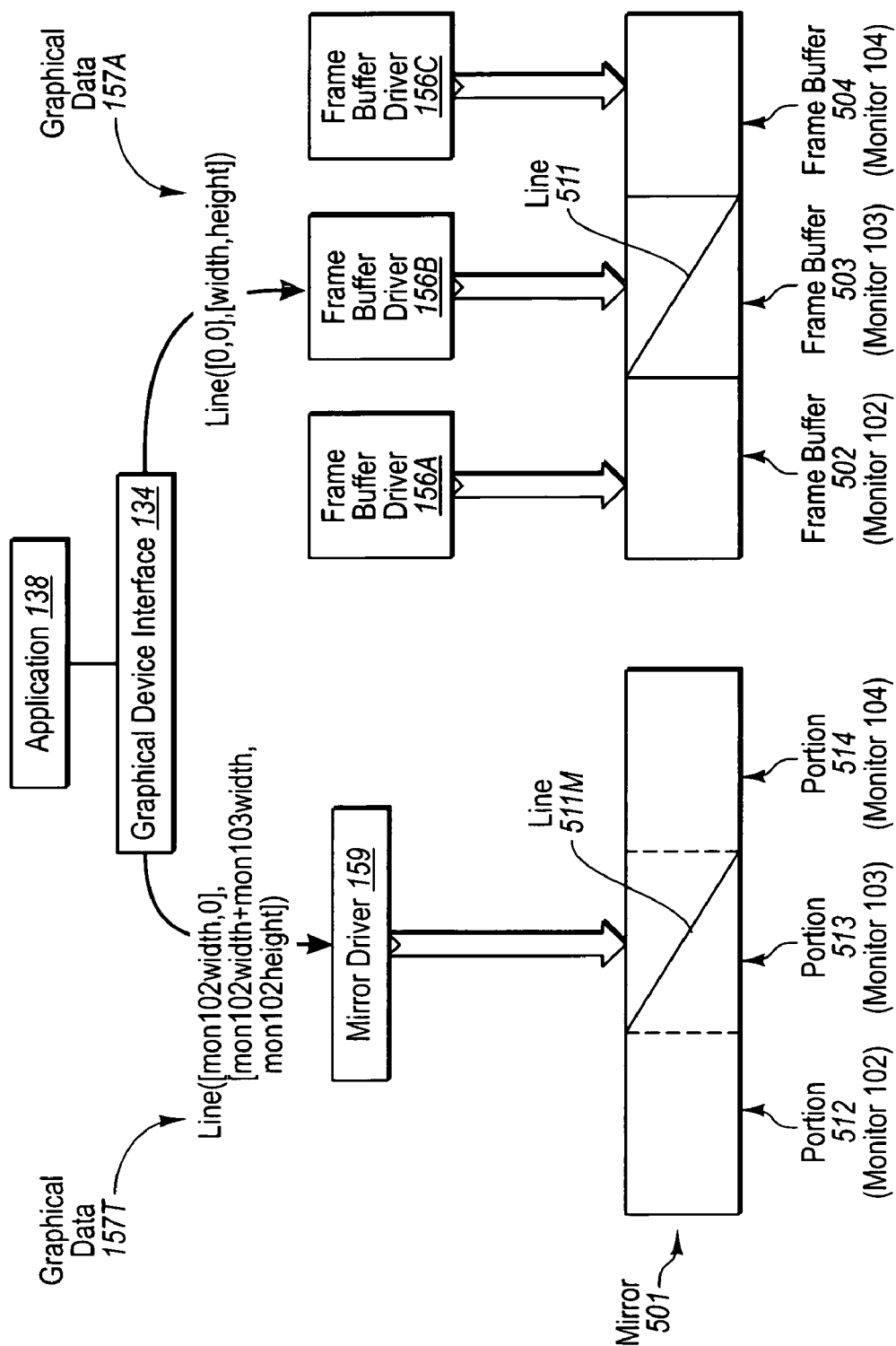
FIG. 5 illustrates an example of mirroring drawing commands.

FIG. 5 illustrates an example of mirroring drawing commands. Within FIG. 5, graphic device interface 134 can receive application data from application 138. Graphic device interface 134 can convert the application data into graphical data to send to any of mirror driver 159 and frame buffer drivers 156A, 156B, and 156B. Mirror 501 is a single buffer having different portions that collectively represent the area of frame buffers 502, 503, and 504. That is, portions 512, 513, and 514 correspond to frame buffers 502, 503, and 504 respectively Thus, mirroring graphical data sent to a frame buffer driver into mirror 501 can include coordinate translations. For example, graphic device interface can send graphical data 157B to frame buffer driver 156B. In FIG. 5, graphical data 157B represents a line between the upper left hand corner of monitor 103 (coordinate [0, 0]) and the lover right hand corner of monitor 103 (coordinate [width of monitor 103, height of monitor 103}). Graphical data 157B can be of the form "Line([0,0], [Width, Height])". Line 511 depicts representative output based on graphical data 157B.

Graphic device interface 134 can also send graphical data 157T to mirror driver 159. In FIG. 5, graphical data 157T also represents a line between the upper left hand corner of monitor 103 (coordinate [0,0]) and the lover right hand corner of monitor 103 (coordinate [width of monitor 103, height of monitor 103}). However, since mirror 501 is a single buffer, graphical data 157T can be of the form "Line([mon102 width, 0], [mon102 width+mon103 width, mon102 height])". Line depicts a representative mirror of line 511 based on graphical data 157T.

Referring back to FIG. 1C, remote display driver 172A can convert graphical data 157A into drawings commands 158A (a portion of drawing commands 158) to be output to surface 166A. Similarly, remote display driver 172B can convert graphical data 157B into drawings commands 158B (a portion of drawing commands 158) to be output to surface 166B. Similarly, remote display driver 172C can convert graphical data 157C into drawings commands 158C (a portion of drawing commands 158) to be output to surface 166C. Each of graphical surfaces 166A, 166B, and 166C correspond to a server side virtual monitor (e.g., display areas 102S, 103S, and 104S respectively), which in turn correspond to client side virtual monitor (e.g., display areas 102D, 103D, and 104D). Each of graphical surfaces 166A, 166B, and 166C can thus correspond to one of a plurality of primary destination drawing surfaces of client 101.

Referring back to FIG. 1D, remote display driver 173 can convert graphical data 157A into drawings commands 158A (a portion of drawing commands 158) to be output to surface 166A. Similarly, remote display driver 173 can convert graphical data 157B into drawings commands 158B (a portion of drawing commands 158) to be output to surface 166B. Similarly, remote display driver 173 can convert graphical data 157C into drawings commands 158C (a portion of drawing commands 158) to be output to surface 166C. Each of graphical surfaces 166A, 166B, and 166C correspond to a server side virtual monitor (e.g., display areas 102S, 103S, and 104S respectively), which in turn correspond to client side virtual monitor (e.g., display areas 102D, 103D, and 104D). Each of graphical surfaces 166A, 166B, and 166C can thus correspond to one of a plurality of primary destination drawing surfaces of client 101.

Method 200 includes an act of sending the drawing commands to the client (act 210). For example, terminal server 131 can send buffered drawing commands 154, including drawing commands 158, to client 101. Method 200 includes an act of receiving drawing commands from the server (act 202). For example, client 101 can receive buffered drawing commands 154, including drawing commands 158, from terminal server 131.

Method 200 includes an act of identifying drawing commands corresponding to each of the at least two monitors (act 203). For example, client component 113 can identify that drawing commands 158A correspond to monitor 102, that drawing commands 158B correspond to monitor 103, and that drawing commands 158C correspond to monitor 104. In some embodiments, client component 113 refers to indication data included in drawing commands 158 (e.g., a primary destination drawing surface) to identify drawing commands corresponding to a monitor. For example, client component 113 can identify drawing commands based on the primary destination drawing surface the daring commands are destined for.

In other embodiments, client component 113 identifies portions of display data corresponding to a monitor based on the characteristics (e.g., geometry) of the data. For example, if client component 113 receives drawing commands at 640× 480 resolution and monitor 103 is operating at 640×480 resolution, client component can identify that the drawing commands are to go to monitor 103.

Method 200 includes an act of rendering identified drawing commands at corresponding monitors (act 204). For example, drawing commands 158A can be rendered at monitor 102, drawing commands 158B can be rendered at monitor 103, and drawing commands 158C can be rendered at monitor 104. Client component 113 can send drawing commands to appropriate video cards corresponding to each monitor. For example, client component 113 can send drawing commands 158A, 158B, and 158C to video cards 192, 193, and 194 respectively.

Each video card can convert the drawing commands to rendering data for rendering at a corresponding monitor. For example, video card 192 can convert drawing commands 158A into render data 162 for rendering at monitor 102. Similarly, video card 193 can convert drawing commands 158B into render data 163 for rendering at monitor 103. Similarly, video card 194 can convert drawing commands 158C into render data 164 for rendering at monitor 104. In some embodiments, a single video card can service a plurality of monitors. Monitors 102, 103, and 104 can render any received render data to represent graphical data 157.

Figure 3:
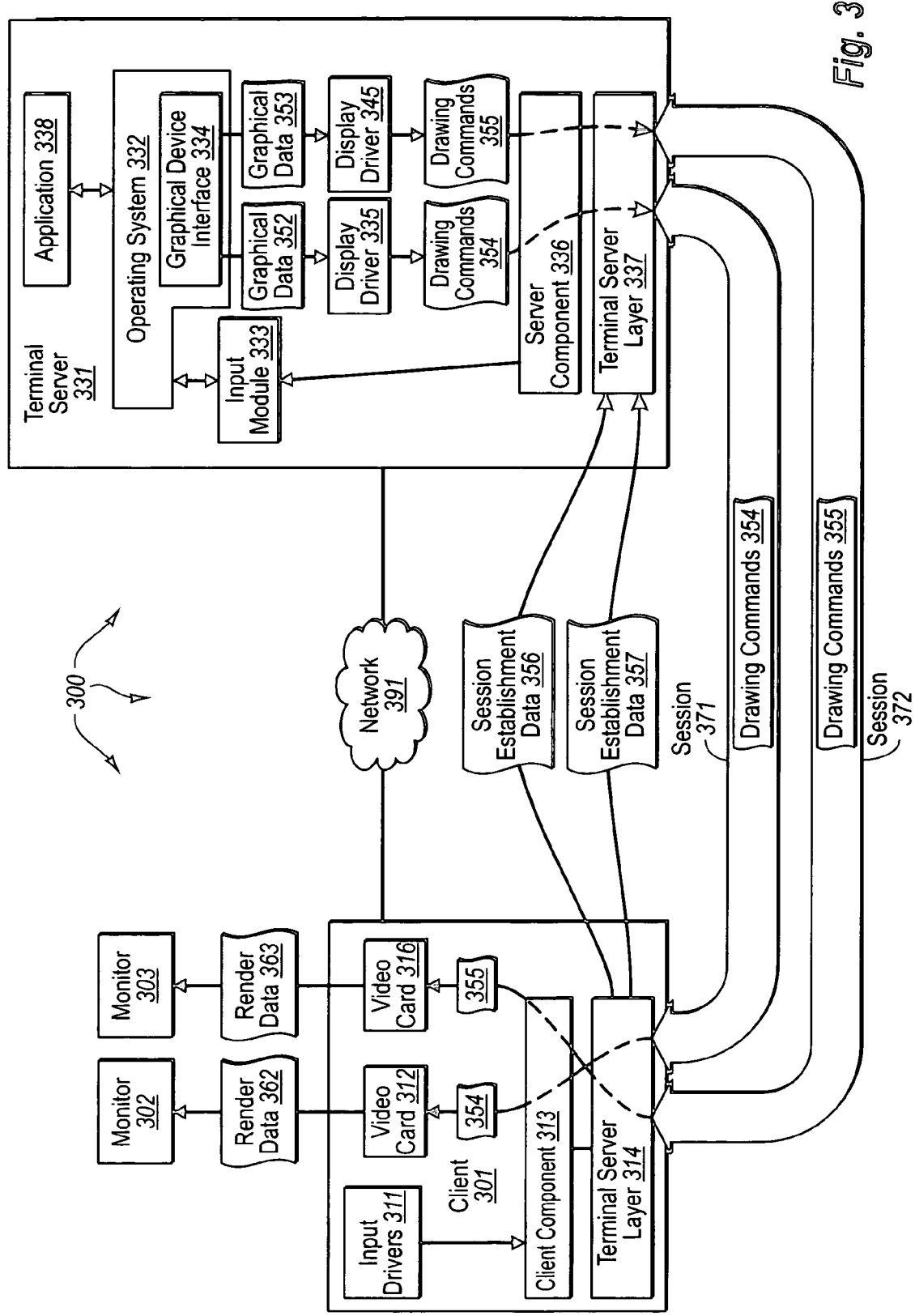
FIG. 3 illustrates another example computer architecture that facilitates appropriately rendering terminal server graphical data at multiple client side monitors.

FIG. 3 illustrates an example computer architecture 300 that facilitates appropriately rendering terminal server graphical data at multiple client side monitors. Computer architecture 300 includes client 301 and terminal server 131. Each of client 301 and terminal server 331 can be connected to network 391. Client 301 and terminal server 331 can exchange messages over network 391.

Generally, client 301 can be a computer system in communication with terminal server 331 for remote execution of applications at terminal server 331. Thus, input data (e.g., mouse and keyboard input) representing application commands is received at input drivers 311. The input data is transferred over network 391 to terminal server 331. Input module 333 receives the input data.

Input module 333 supplies the input data to the appropriate application at terminal server 331. The application generates output display data in response to the input data (or on its own). The output display data is transferred over network 391 to client 301. Client component 312 receives the output display data and determines how to distribute the output display data at video display devices associated with client 301. Client component 312 is configured to identify drawing commands corresponding to specific monitors. Client component 312 passing drawing commands to appropriate video cards for rendering at appropriate monitors. Thus, input is received and output presented at the client 301, while processing actually occurs at the terminal serer 131.

The components of client 301 (e.g., client component 313, terminal server layer 314, and other lower level layers) can operate in a layered manner similar to client 101. Likewise, the components of terminal server 331 (e.g., server component 336, terminal server layer 337, and other lower level layer) can operate in a layered manner similar to terminal server 131.

Accordingly, terminal server 331 can forward received client side data to input module 333. Input module 333 can present the client side data to operating system 132. Operating system 332 then distributes the input data to the appropriate application (e.g., application 338).

In response to client side data (or on its own), an application can generate output display data. The application can send output display commands to operating system 332. Operating system 332 and graphical device interface ("GDI") 334 can interoperate to output corresponding graphic update commands (e.g., GDI rendering commands) to appropriate display drivers. Remote display drivers (e.g., display drivers 335 and 336) can collect the graphic update commands and generate corresponding drawing commands configured for a specified display device. Remote display drivers can convert graphic update commands into drawing commands (e.g., graphic update PDUs) for rendering at specified client side display devices.

Logically (i.e., abstracted from lower layer protocols), terminal server layer 314 and terminal server layer 337 can be configured to establish terminal server sessions, in accordance with terminal server protocols, between client 301 and terminal server 331. A plurality of terminal server sessions can be associated with a single user session. That is, a user can log in creating a user session, and can subsequently cause a plurality of terminal server sessions to be established between client 301 and terminal server 331.

Figure 4:
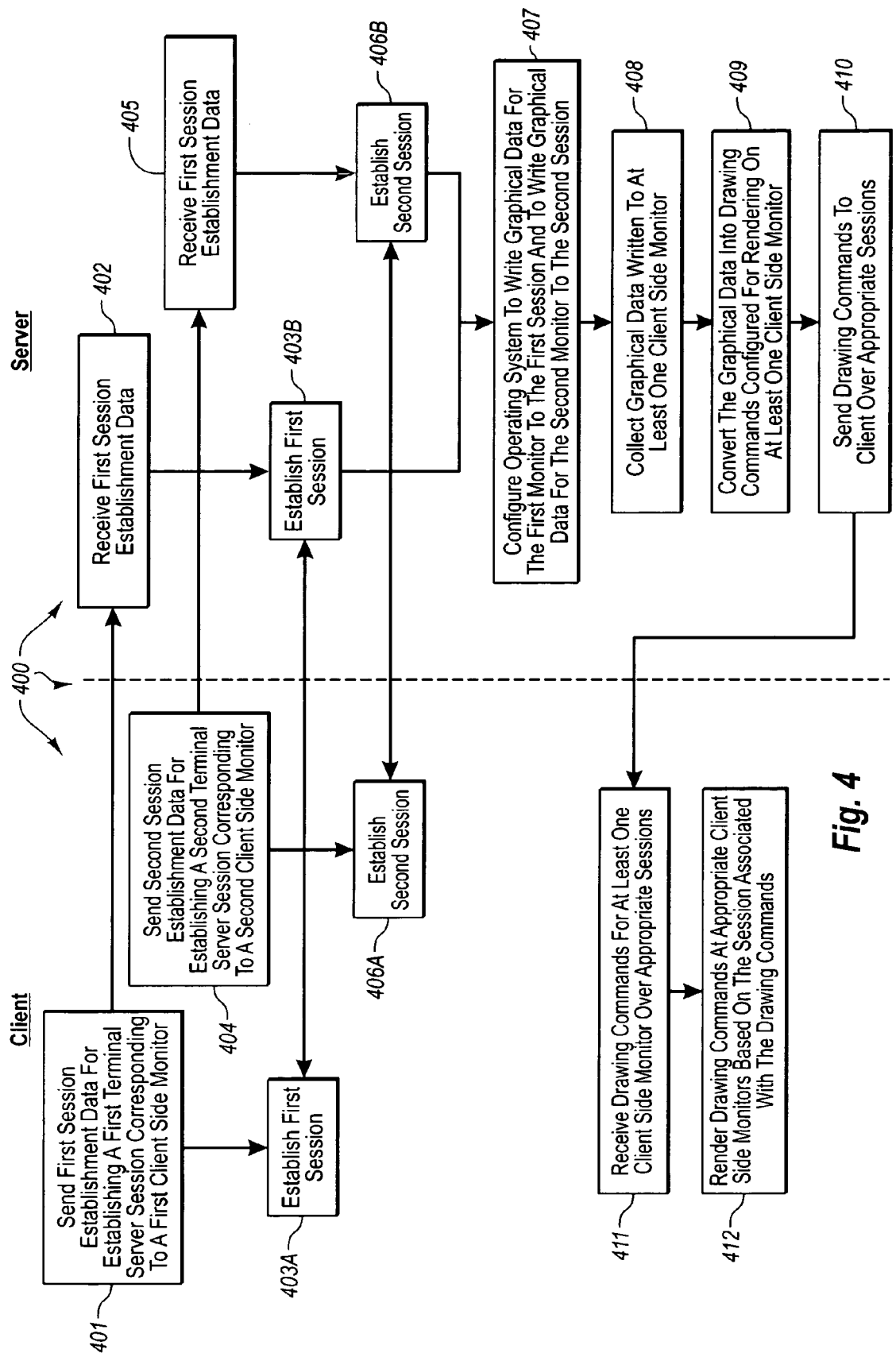
FIG. 4 illustrates a flow chart of another example method for appropriately rendering terminal server graphical data at multiple client side monitors.

FIG. 4 illustrates a flow chart of another example method for appropriately rendering terminal server graphical data at multiple client side monitors. The method 400 will be described with respect to the components and data in computer architecture 300.

Method 400 includes an act of sending first session establishment data for establishing a first terminal server session corresponding to a first client side monitor (act 401). For example, terminal server layer 314 can send session establishment data 356 to terminal server layer 337. Session establishment data 356 can be for establishing a terminal server session for transferring display data to monitor 302. Method 300 includes an act of receiving first session establishment data (act 402). For example, terminal server layer 337 can receive send session establishment data 356 from terminal server layer 314. Method 300 includes acts of establishing a first session (acts 403A and 403B). For example, terminal server layers 314 and 337 can negotiate to establish session 371 (e.g., and RDP session) between client 301 and terminal server 331. Through session establishment data 356 or during negotiation, terminal server layer 314 can indicate that session 371 is for remote execution of application 338 and that drawing commands are to be transferred to monitor 302. The indication that display data for monitor 302 is to be transferred over session 371 can be passed up to operating system 332 and retained by operating system 332.

Method 400 includes an act of sending second session establishment data for establishing a second terminal server session corresponding to a second client side monitor (act 404). For example, terminal server layer 314 can send session establishment data 357 to terminal server layer 337. Session establishment data 357 can be for establishing a terminal server session for transferring display data to monitor 303. Method 400 includes an act of receiving second session establishment data (act 405). For example, terminal server layer 337 can receive send session establishment data 355 from terminal server layer 314. Method 400 includes acts of establishing a first session (acts 406A and 406B). For example, terminal server layers 314 and 337 can negotiate to establish session 372 (e.g., and RDP session) between client 301 and terminal server 331. Through session establishment data 357 or during negotiation, terminal server layer 314 can indicate that session 372 is for remote execution of application 338 and that drawing commands are to be transferred to monitor 303. The indication that display data for monitor 303 is to be transferred over session 372 can be passed up to operating system 332 and retained by operating system 332.

Thus, session 371 and session 372 can both be sessions established for remote execution of application 338 (and associated with a single user session). Input data can be transferred over either or both of sessions 371 and 372 to send the input data to application 338.

Client 301 can also send one or more additional portions of session establishment data to terminal server 331. Each of the portions of session establishment data can be for establishing another terminal server session for an additional client side monitor. Client 301 and terminal server 331 can establish an additional session for each of the additional client side monitors. Thus, in some embodiments, there can be from 1 and N sessions between client 310 and terminal server 331, wherein N is the number of client side monitors.

Method 400 includes an act of configuring an operating system to write graphics data for the first monitor to the first session and to write graphical data for the second monitor to the second session (act 407). For example, operating system 332 can configure graphical device interface 334 to write graphical data for monitor 302 to session 371. Similarly, operating system 332 can configure graphical device interface 334 to write graphics data for monitor 303 to session 372. Operating system 332 can also graphical device interface 334 to write graphical data for additional client side monitors to appropriate additional sessions.

Graphical device interface 334 can communicate with any available remote display drivers, including display drivers 335 and 345, to determine the configuration of monitors 302 and 303. For example, graphical device interface 334 can obtain graphical output settings, such as, for example, resolution, color depth settings, etc., from display drivers 352 and 353. Graphic device interface 134 can configure a desktop for monitors 302 and 303 based on obtained graphical output settings.

In response to input data (e.g., received at input module 333), application 338 can generate output display data.

Graphical device interface 334 can receive application output display data can and convert the output display data to graphical data (e.g., GDI rendering commands) for output to an appropriate display driver (e.g., display driver 335 or display driver 345). For example, graphical device interface 334 can output graphics data 352 and 353 to display drivers 335 and 345 respectively. Graphical device interface 334 can also output graphical data for other display drivers corresponding to additional client side monitors.

Method 400 includes an act of collecting graphical data written to at least one client side monitor (act 408). Method 400 includes an act of converting the graphical data into drawing commands configured for rendering the at least one client side monitor (act 409). For example, display driver 335 can collect graphical data 352. Display driver 335 can convert graphical data 352 to drawing commands 354 for rendering at monitor 303. Similarly, display driver 345 can collect graphical data 353. Display driver 345 can convert graphical data 353 to drawing commands 355 for rendering at monitor 302. Other display drivers can access graphical data and convert the graphical data to drawing commands for rendering at other client side monitors.

Alternately, there may be a single remote display driver that collects graphical data and converts graphical data into drawing commands for a plurality of different monitors. The single remote display driver can be configured to match drawing commands to appropriate terminal server sessions.

Method 400 includes an act of sending the drawing commands to the client over the appropriate sessions (act 410). For example, terminal server 131 can send drawing commands 354 (representing output from application 338) to client 301 over session 371. Similarly, terminal server 131 can send drawing commands 355 (representing output from application 338) to client 301 over session 372. Terminal server 131 can also send other drawing commands over other established sessions to client 301.

Method 400 includes an act of receiving drawing commands for at least one client side monitor over appropriate sessions (act 411). For example, client 301 can receive drawing commands 354 (representing output from application 338) from terminal server 131 over session 371. Similarly, client 301 can receive drawing commands 355 (representing output from application 338) from terminal server 131 over session 372. Client 101 can also receive other drawing commands over other established sessions.

Drawing commands 354 and 355 (and drawing commands from other sessions) can be forwarded up to client component 313 Client component 313 can identify drawing commands corresponding to each of a plurality of monitors based on the session associated with the drawing commands. For example, client component 313 can identify that drawing commands 354 correspond to monitor 302 based on reception via session 371, that drawing commands 355 corresponds to monitor 303 based on reception via session 372, etc.

Method 400 includes an act of rendering drawing commands at an appropriate client side monitor based on the session associated with the display data (act 411). For example, drawing commands 354 can be rendered at monitor 302, drawing commands 355 can be rendered at monitor 103, etc. Client component 313 can send drawing commands to appropriate video cards corresponding to each monitor. For example, client component 113 can send drawing commands 554 and 555 video cards 312 and 316 respectively.

Each video card can convert the drawing commands to rendering data for rendering at a corresponding monitor. For example, video card 312 can convert drawing commands 554 into render data 362 for rendering at monitor 302. Similarly, video card 316 can convert drawing commands 355 into render data 163 for rendering at monitor 303. In some embodiments, a single video card can service a plurality of monitors. Monitors 302 and 303 can render any received render data to represent graphical data 352 and 353.

Accordingly, embodiments of the invention facilitate appropriately rendering terminal server display data at a plurality of client side monitors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including a terminal server with a server side desktop configured to produce drawing commands, a method for providing drawing commands that can be appropriately rendered at a plurality of client side monitors, the method comprising:
  an act of receiving a client side monitor configuration from a client, the client side monitor configuration indicating a physical arrangement of a plurality of monitors relative to one another at the client;
  an act of simulating a virtual desktop for the plurality of monitors based on the client side monitor configuration;
  an act of configuring an operating system to write graphical data to the simulated virtual desktop;
  an act of collecting graphical data written from the operating system to the simulated virtual desktop, the graphical data directed to at least two monitors in the simulated virtual desktop;
  an act of converting the graphical data into drawing commands configured for rendering on at least two monitors of the plurality of monitors; and
  an act of sending the drawing commands to the client such that the client can render the graphical data on the at least two monitors.

2. The method as recited in claim 1, wherein the act of receiving a client side monitor configuration from a client comprises an act of receiving a client side monitor configuration indicating the resolution of each monitor in the plurality of monitors.

3. The method as recited in claim 1, wherein the act of simulating a virtual desktop for the plurality of monitors based on the client side monitor configuration comprises an act of arranging and bounding the combined display of the plurality of monitors similar to a virtual desktop at the client.

4. The method as recited in claim 1, wherein the act of collecting graphical data comprises:
  an act of a mirror driver receiving a first portion of graphical data corresponding to a first monitor of the simulated virtual desktop, the first portion of graphical data mirrored from graphical data sent to a first frame buffer driver, the first frame buffer driver having previously indicated output characteristics for the first monitor to the operating system and that graphical data for the first monitor is to be mirrored to the mirror driver; and
  an act of a mirror driver receiving a second portion of graphical data corresponding to a second monitor of the simulated virtual desktop, the second portion of graphical data mirrored from graphical data sent to a second frame buffer driver, the second frame buffer driver having previously indicated output characteristics for the second monitor to the operating system and that graphical data for the second monitor is to be mirrored to the mirror driver.

5. The method as recited in claim 4, wherein the act of converting the graphical data comprises an act of the mirror driver converting the first and second portions of graphical data into drawing commands on a single graphical surface, the drawing commands for rendering at the first and second monitors.

6. The method as recited in claim 1, wherein the act of collecting graphical data written to the virtual desktop comprises:
   a first remote display driver receiving a first portion of graphical data corresponding to a first monitor of the simulated virtual desktop, the first remote display driver having previously indicated the output characteristics of the first monitor to the operating system; and
   a second remote display driver receiving a second portion of graphical data corresponding to a second monitor of the simulated virtual desktop, the second remote display driver having previously indicated the output characteristics of the second monitor to the operating system.

7. The method as recited in claim 6, wherein the act of converting the graphical data comprises:
   an act of the first remote display driver converting the first portion of graphical data into first drawings commands on a first graphical surface, the first drawing commands for rendering at the first monitor; and
   an act of the second remote display driver converting the second portion of graphical data into second drawings commands on a second graphical surface, the second drawing commands for rendering at the second monitor.

8. The method as recited in claim 1, wherein the act of collecting graphical data written to the virtual desktop comprises:
   a remote display driver receiving a first portion of graphical data corresponding to a first monitor of the simulated virtual desktop, the remote display driver having previously indicated the output characteristics of the first monitor to the operating system; and
   the remote display driver receiving a second portion of graphical data corresponding to a second monitor of the simulated virtual desktop, the remote display driver having previously indicated the output characteristics of the second monitor to the operating system.

9. The method as recited in claim 8, wherein the act of converting the graphical data comprises:
   an act of the remote display driver converting the first portion of graphical data into first drawings commands on a first graphical surface, the first drawing commands for rendering at the first monitor; and
   an act of the remote display driver converting the second portion of graphical data into second drawings commands on a second graphical surface, the second drawing commands for rendering at the second monitor.

10. The method as recited in claim 1, wherein that act of sending the drawing commands to the client comprises an act of sending drawing commands over an RDP session.

11. At a computer system including a plurality of monitors configured to rendering drawing commands, a method for providing drawing commands that can be appropriately rendered at a plurality of client side monitors the method comprising:
   an act of sending client side monitor configuration to a server, the client side monitor configuration indicating a physical arrangement of a plurality of monitors relative to one another at the client;
   an act of receiving a drawing commands from the server, the drawing commands for rendering on at least two monitors of plurality of monitors;
   an act of identifying drawing commands that correspond to each of the at least two monitors; and
   an act of rendering identified drawing commands at corresponding monitors.

12. The method as recited in claim 11, wherein the act of sending client-side monitor configuration comprises an act of sending client monitor characteristics that can be used to simulate a virtual desktop for the plurality of monitors.

13. The method as recited in claim 11, wherein the act of identifying drawing commands corresponding to each of the plurality of monitors comprises an act of identifying drawing commands based on the resolution of the drawing commands.

14. The method as recited in claim 11, wherein the act of identifying drawing commands corresponding to each of the plurality of monitors comprises an act of identifying drawing commands from indication data including in drawing commands.

15. At a computer system including a terminal server with a server side desktop configured to produce drawing commands, a method for providing drawing commands that can be appropriately rendered at a plurality of client side monitors, the method comprising:
   an act of receiving first session establishment data from a client, the first session establishment data for establishing a first terminal server session corresponding to a first client side monitor;
   an act of receiving second session establishment data from the client, the second session establishment data for establishing a second terminal server session corresponding to a second client side monitor;
   an act of establishing a first session to the client in accordance with the first connection establishment data, the first session for sending drawing commands to the first client side monitor;
   an act of establishing a second session to the client in accordance with the second connection establishment data, the second session for sending drawing commands to the second client side monitor;
   an act of configuring an operating system to write graphical data for the first monitor to the first session and to write graphical data for the second monitor to the second session;
   an act of collecting graphical data written from the operating system to at least one client side monitor, the graphical data including drawing commands directed to the at least one client side monitor;
   an act of converting the graphical data into drawing commands configured for rendering on at least one client side monitor; and
   an act of sending the drawing commands to the client over the appropriate sessions.

16. The method as recited in claim 15, wherein the acts of establishing first and second sessions to the client comprises acts of establishing first and second RDP session to the client respectively.

17. The method as recited in claim 15, wherein the act of configuring the operating system to write graphical data for the first monitor to the first session and to write graphical data for the second monitor to the second session comprises:
   an act of first display driver configuring the operating system to write graphical data for the first monitor to the first display driver; and an act of second display driver configuring the operating system to write graphical data for the second monitor to the second display driver.

18. The method as recited in claim 17, wherein the act of sending the drawing commands to the client over the appropriate sessions comprises:

an act of the first display driver sending graphical data for the first monitor to a server side component for transfer over the first session; and an act of the second display driver sending graphical data for the second monitor to the server side component for transfer over the second session.

19. The method as recited in claim 15, wherein the act of configuring the operating system to write graphical data for the first monitor to the first session and to write graphical data for the second monitor to the second session comprises:

an act of a display driver configuring the operating system to write graphical data for the first monitor to the display driver; and an act of the display driver configuring the operating system to write graphical data for the second monitor to the display driver.

20. The method as recited in claim 19, wherein the act of sending the drawing commands to the client over the appropriate sessions comprises:

an act of the display driver sending graphical data for the first monitor to a server side component for transfer over the first session; and an act of the display driver sending graphical data for the second monitor to the server side component for transfer over the second session.

* * * * *